(12) United States Patent
Manjon Sanchez

(10) Patent No.: US 9,239,461 B2
(45) Date of Patent: Jan. 19, 2016

(54) AIRCRAFT COCKPIT WITH HEAD-UP DISPLAY DEVICE

(71) Applicant: Airbus Operations (SAS), Toulouse (FR)

(72) Inventor: Javier Manjon Sanchez, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 3 days.

(21) Appl. No.: 14/052,902

(22) Filed: Oct. 14, 2013

(65) Prior Publication Data

US 2014/0104693 A1    Apr. 17, 2014

(30) Foreign Application Priority Data

Oct. 12, 2012    (FR) ...................................... 12 59766

(51) Int. Cl.
*G02B 27/01* (2006.01)
*B64D 45/00* (2006.01)

(52) U.S. Cl.
CPC ............ *G02B 27/0149* (2013.01); *B64D 45/00* (2013.01); *G02B 27/01* (2013.01); *G02B 2027/015* (2013.01); *G02B 2027/0161* (2013.01)

(58) Field of Classification Search
CPC ................... G02B 27/0149; G02B 2027/0156; G02B 27/01

USPC .................. 359/631–632, 630; 348/113–120; 345/7–8; 353/11–14
See application file for complete search history.

(56) References Cited

U.S. PATENT DOCUMENTS

| | | | |
|---|---|---|---|
| 4,632,508 A | 12/1986 | Connelly | |
| 5,037,166 A | 8/1991 | Malcolm et al. | |
| 6,750,832 B1 * | 6/2004 | Kleinschmidt | 345/7 |
| 2005/0036076 A1 * | 2/2005 | Lee et al. | 348/787 |
| 2007/0183055 A1 * | 8/2007 | Maliah et al. | 359/632 |
| 2009/0122413 A1 * | 5/2009 | Hoffman et al. | 359/630 |
| 2010/0060730 A1 | 3/2010 | Poussin et al. | |

FOREIGN PATENT DOCUMENTS

| | | | |
|---|---|---|---|
| EP | 0170523 | 2/1986 | |
| FR | 2935810 | 3/2010 | |
| GB | 924790 | * 5/1963 | ............ G03B 21/50 |
| WO | 2008106602 | 9/2008 | |

OTHER PUBLICATIONS

French Search Report, May 31, 2013.

* cited by examiner

*Primary Examiner* — Scott J Sugarman
*Assistant Examiner* — Kristina Deherrera
(74) *Attorney, Agent, or Firm* — Greer, Burns & Crain, Ltd.

(57) ABSTRACT

An aircraft cockpit comprises a head-up display device comprising a projector and a screen, the screen being placed facing a pilot along a theoretical line of sight of the pilot. The projector is fixed to a side wall of the cockpit, the screen forming a non-zero angle of inclination relative to a plane perpendicular to the theoretical line of sight of the pilot.

5 Claims, 3 Drawing Sheets

AIRCRAFT COCKPIT WITH HEAD-UP DISPLAY DEVICE

CROSS-REFERENCES TO RELATED APPLICATIONS

This application claims the benefit of the French patent application No. 1259766 filed on Oct. 12, 2012, the entire disclosures of which are incorporated herein by way of reference.

BACKGROUND OF THE INVENTION

The present invention relates to an aircraft cockpit comprising a head-up display device.

It also relates to an aircraft comprising such a cockpit.

The present invention relates generally to the positioning of a head-up display device in a cockpit.

A head-up display device, known as an HUD device, comprises a projector and an associated screen, the projector being capable of projecting an image onto the screen (also known as a Combiner).

Said screen is placed facing a pilot along a theoretical line of sight of the pilot in order to reflect the image received towards the pilot's eye.

The projector is mainly composed of a light source and an optical assembly used to collimate the light and send an image towards the screen.

Conventionally, the projector is placed in an area of the cockpit located above the pilot, so that it is centered in the lateral direction of the cockpit with the pilot's gaze.

Thus, the projector is generally fixed to the ceiling of the cockpit so that its projection axis extends substantially in a vertical plane in which the pilot's theoretical line of sight also extends, i.e., the sight line defined as the axis passing through a theoretical eye of the pilot and through the projection center of the screen.

The screen is placed in a viewing area of the pilot in such a way that the image projected onto the screen is superimposed on the scene outside the cockpit, seen by the pilot through the screen and the glazed front of the cockpit.

Such a head-up display device is described in particular in FR 2 942 343.

However, a cockpit, particularly in an aircraft, is limited in terms of space so that the conventional positioning of a projector above the pilot's head is difficult to achieve. In particular, it is necessary to provide sufficient space above the pilot's head to prevent him from hitting himself on the projector, particularly in the event of turbulence.

This problem will worsen in future as the space available in aircraft cockpits is decreasing more and more.

SUMMARY OF THE INVENTION

The purpose of the present invention is to propose an aircraft cockpit comprising a head-up display device making the best possible use of the space available in the cockpit.

To this end, the present invention relates to an aircraft cockpit comprising a head-up display device comprising at least one projector and a screen, the screen being placed facing a pilot along a theoretical line of sight of the pilot.

According to the invention, said at least one projector is fixed to a side wall of the cockpit, the screen forming a non-zero angle of inclination relative to a plane perpendicular to the theoretical line of sight of the pilot.

A side wall of the aircraft cockpit is a wall located on the pilot's side, when said pilot is looking along the pilot's theoretical line of sight. The side walls thus extend substantially in a longitudinal direction of the aircraft. In the context of an aircraft comprising a cockpit comprising a floor, a substantially transverse instrument panel and a ceiling (which may for example hold a dome light), the side walls can be defined as the walls that link the floor of the cockpit to the ceiling thereof, and are longitudinally located on the side of the pilot relative to the instrument panel. The side walls are therefore generally located on the left and right of the pilot's seat (and the co-pilot's seat if it is a double cockpit). They are generally substantially vertical.

Due to the positioning of the projector in a lateral position, on the pilot's side, it is possible to free up the upper space of the cockpit, and in particular the space located above the pilot's head, in order to meet certification standards requiring a minimum space available above the pilot's head.

Furthermore, by orienting the screen so that it is no longer parallel to the plane perpendicular to the pilot's theoretical line of sight, but along a non-zero angle of inclination, the screen projection center can be arranged facing the projector, in the projection axis thereof.

According to a feature, the head-up display device comprises two projectors respectively fixed to two opposite side walls of the cockpit.

The use of two projectors in a head-up display device makes it possible to safeguard the operation of the device through the redundancy of the propagation means, particularly in the event that one of the projectors fails.

In practice, the screen is rotatable on a screen bracket, between a first position in which the projection center of the screen is located in the projection axis of a first of said projectors and a second position in which the projection center is located in the projection axis of the second of said projectors.

Thus, in the event that either of the projectors fails, the screen can be pivoted on the screen bracket and occupy the first position or the second position in order to receive and reflect the image projected by the projector during operation.

According to a practical embodiment feature, the head-up display device comprises means of rotating the screen, the rotation means being controlled by a control signal sent by a control system depending on the operating status of said two projectors.

Thus, the control system can send a control signal to obtain the automatic rotation of the screen.

According to an embodiment of the invention, the head-up display device comprises two computers capable of sending display data along a main link to one of said two projectors respectively, said two computers also being capable of sending display data along an auxiliary link to the other of said two projectors respectively.

Thus, the head-up display device has a redundant architecture both in terms of the projectors and the associated computers, which makes it possible, through the existence of an auxiliary link, to send display data to the other projector in the event that one of the projectors fails.

This arrangement also makes it possible to improve the robustness and reliability of the head-up display system.

According to another embodiment, the cockpit comprises two head-up display devices, each comprising a projector and a screen, said screen being placed facing a pilot or co-pilot respectively, along a theoretical line of sight of the pilot or co-pilot respectively.

The projectors of the two head-up display devices are respectively fixed to two opposite side walls of the cockpit, said screen placed facing a pilot or co-pilot respectively forming a non-zero angle of inclination relative to a plane perpendicular to said theoretical line of sight of the pilot or co-pilot respectively.

It is thus possible in a double cockpit to arrange two projectors substantially symmetrically on the side walls of the cockpit extending on the left-hand side of the pilot and on the right-hand side of the co-pilot.

According to a second aspect, the present invention relates to an aircraft comprising a cockpit as described above.

Said aircraft has similar features and advantages to those described in relation to the cockpit.

Further features and advantages of the invention will become apparent from the following description.

BRIEF DESCRIPTION OF THE DRAWINGS

In the attached drawings, given as non-limitative examples.

DETAILED DESCRIPTION OF THE PREFERRED EMBODIMENTS

A cockpit according to a first embodiment of the invention will first be described with reference to FIG. 1.

A cockpit located at the front of an aircraft is shown in diagrammatic partial view.

Said cockpit is equipped with a head-up display device 10 comprising in this embodiment a projector 11 and a screen 12 known as a combiner.

By way of example, in this type of head-up display device, the screen 12 can be constituted by a concave transparent glass plate through which the pilot can see the scene outside the front of the aircraft.

The use of such a head-up display device 10 in an aircraft cockpit is known per se and generally makes it possible to project on a screen floating in space, at the height of a pilot's (or co-pilot's) eyes, a virtual image superimposed on reality, i.e., on the view outside the aircraft, in front of the nose of the aircraft.

The screen 12 is for example made from a reflective glass, treated so that it reflects a light wave having a predetermined wavelength, for example corresponding to green light.

Green-colored symbols can thus be displayed on the screen, to provide the pilot with air handling data.

Said screen 12 thus has a concave surface on which the images projected by the projector 11 are reflected.

The screen 12 is placed facing a pilot P along a theoretical line of sight X of the pilot.

Said theoretical line of sight X of the pilot P can be defined as the axis passing through the eye of the theoretical pilot and through the point, on the screen 12 of the head-up display device 10, of the projection center on the screen 12.

Figure 1:
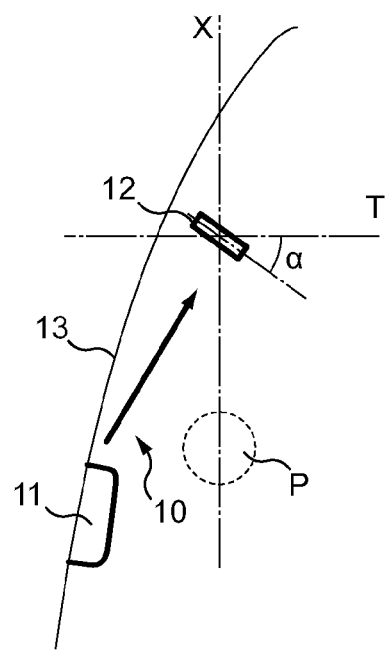
FIG. 1 is a top view diagram of a cockpit equipped with a head-up display device according to a first embodiment of the invention.

As clearly shown in FIG. 1, the projector 11 is fixed to a side wall 13 of the cockpit, and here on the left-hand side wall, located on the left of the pilot P. The projector 11 can be fixed to the side wall 13 by any conventional fixing means.

The positioning of said projector 11 on the side wall 13 of the cockpit thus makes it possible to free up the space above the head of the pilot P in the cockpit.

The projector 11 conventionally comprises a light source (for example a light-emitting diode, LED) and an optical assembly constituted by glasses and lenses used to collimate light and send an image to the screen 12.

The screen 12 forms a non-zero angle of inclination $\alpha$ relative to a plane T perpendicular to the theoretical line of sight X of the pilot P.

When the theoretical line of sight X of the pilot P substantially corresponds to the longitudinal axis of the aircraft, the plane T perpendicular to said theoretical axis X also corresponds to a transverse plane of the aircraft.

As the screen 12 is formed from a concave transparent glass plate, it extends overall in a vertical plane corresponding for example to a plane tangent to the projection center of the screen 12.

Thus, the non-zero angle of inclination $\alpha$ can be defined between the vertical plane corresponding to a plane tangent to the screen 12 and the plane T perpendicular to the theoretical line of sight X of the pilot P.

Generally, the angle $\alpha$ is determined in such a way that the light is reflected onto the screen 12 in the direction of the eyes of the pilot P, parallel to the theoretical line of sight X of the pilot P.

The screen 12 is thus arranged in a position in which the projection center of the screen 12 is located in the projection axis (shown by the arrow F in FIG. 1) of the projector 11.

It will be noted that in FIG. 1, the non-zero angle of inclination $\alpha$ has been amplified for illustrative purposes. In practice, the angle of inclination $\alpha$ depends on the geometry of the cockpit, and particularly the positions and directions of the projector 11 and the pilot P.

By way of non-limitative example, the non-zero angle of inclination $\alpha$ is between 1° and 20°, and for example between 5° and 15°.

Figure 2:
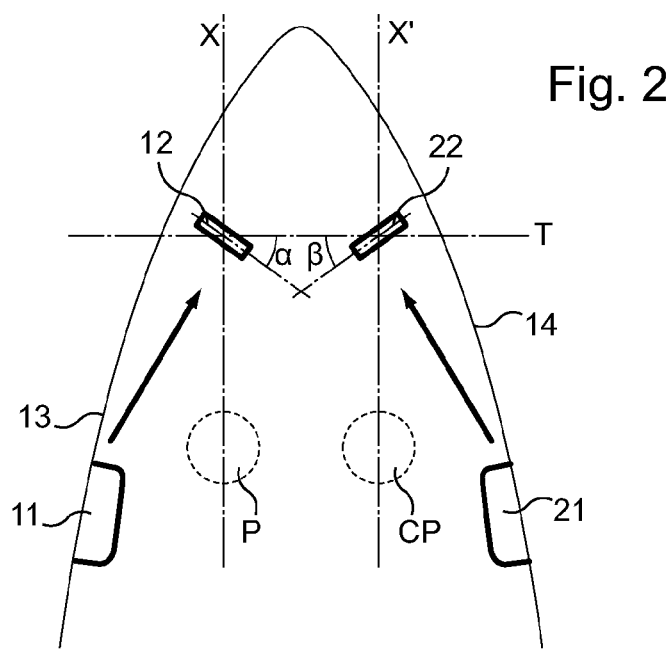
FIG. 2 is a diagram showing a cockpit comprising two head-up display devices according to a second embodiment of the invention.

FIG. 2 shows a second embodiment in the context of a cockpit occupied by a pilot P and a co-pilot CP.

Traditionally, the pilot P is placed on the left and the co-pilot CP is placed on the right of the cockpit.

In this embodiment, the cockpit comprises two head-up display devices 10, 20.

Said head-up display devices 10, 20 are identical to the device described above with reference to FIG. 1 and placed symmetrically in the cockpit.

Thus, more precisely, screens 12, 22 are placed facing the pilot P and co-pilot CP respectively, along the theoretical line of sight X, X' of the pilot P and co-pilot CP respectively.

The projectors 11, 21 of the two head-up display devices 10, 20 are fixed respectively to the two side walls 13, 14 of the cockpit, opposite each other.

Thus, a first projector 11 is placed on the left-hand side wall of the cockpit, on the left of the pilot P, and a second projector 21 is placed on the right-hand side wall 14, on the right of the co-pilot CP.

The screens 12, 22 each form a non-zero angle of inclination $\alpha$, $\beta$ relative to the plane T perpendicular to the theoretical lines of sight X, X' of the pilot and co-pilot.

It will be noted that the theoretical lines of sight of the pilot P and co-pilot CP are parallel and thus define one and the same line of sight of the aircraft, according to the structure of the aircraft.

Depending on the positioning of the projectors 11, 21 of the head-up display devices 10, 20, the non-zero angles of inclination α, β formed by each screen 12, 22 with the plane T perpendicular to the theoretical line of sight X, X' can be identical or different.

In particular, in a symmetrical cockpit without any errors in the positioning of the projectors 11, 21 symmetrically on the two side walls 13, 14 of the cockpit, the non-zero angles of inclination α, β are identical.

Of course, if the cockpit is not symmetrical and/or if the two projectors 11, 21 are not installed symmetrically on the two side walls 13, 14 of the cockpit, the non-zero angles of inclination α, β will be different.

Furthermore, an alignment error of one or both projectors 11, 21 can be corrected by modifying the non-zero angle of inclination α, β.

In the two head-up display devices 10, 20, the screens 12, 22 are arranged in such a way that the projection center of each screen 12, 22 is located in the projection axis of the two projectors 11, 21 respectively.

This embodiment thus makes it possible to have two head-up display devices in an aircraft cockpit, while freeing up the upper area of the cockpit, located above the head of the pilot P and co-pilot CP.

Figure 3:
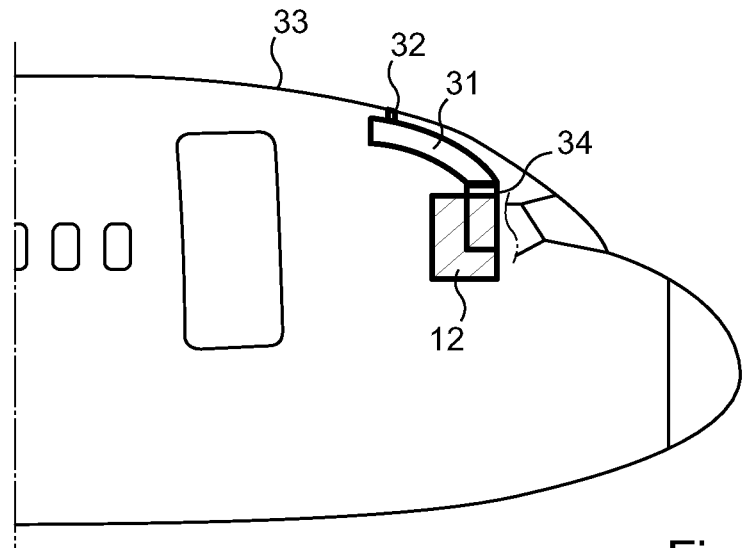
FIG. 3 is a side view diagram showing the mounting of a head-up display device screen in a cockpit according to an embodiment of the invention.
Figure 4:
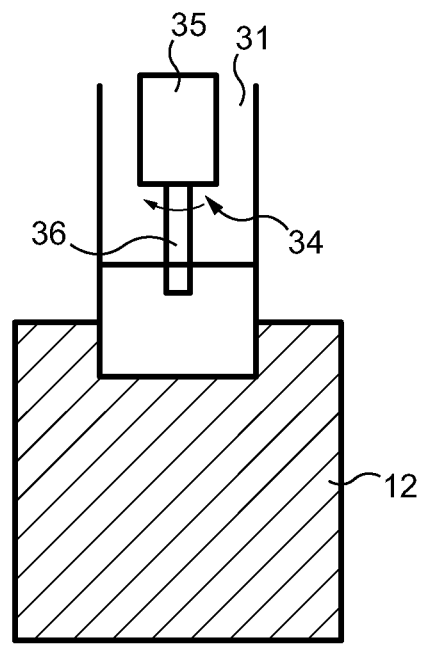
FIG. 4 is a diagram showing the rotatable mounting of a head-up display device screen in a cockpit according to an embodiment of the invention.

Furthermore, FIGS. 3 and 4 show an example of mounting a head-up display device screen, here the screen 12 of the head-up display device 10 as shown in FIG. 1.

The screen 12 is mounted on a screen bracket, here constituted by an arm 31 fixed by conventional fixing means 32 to the ceiling 33 of the cockpit.

Thus, the screen 12 itself is suspended from the ceiling 33 of the cockpit, in front of the pilot P.

The screen 12 can be mounted fixed on the arm 31, oriented in the direction of the projector 11 and forming the non-zero angle of inclination α with the perpendicular plane T as described above.

It is also possible to provide for the screen 12 to be oriented in the direction of the projector 11 of the head-up display device 10, by mounting the screen 12 rotatably on the screen bracket, here constituted by an arm 31.

As also clearly shown in FIG. 4, the head-up display device then comprises rotation means 34 mounting the screen 12 rotatably on the arm 31. Said rotation means 34 can be of any type and can conventionally comprise, for example, a motor 35 capable of rotating a rod 36, itself secured to the screen 12, to obtain the pivoting thereof.

Figure 5:
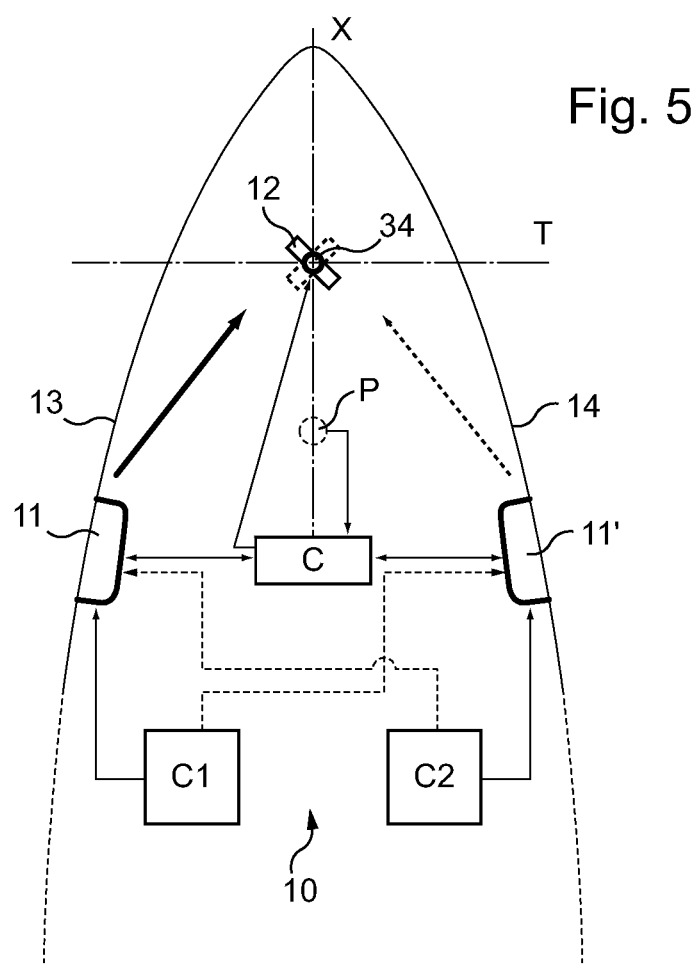
FIG. 5 is a top view diagram of a cockpit comprising a head-up display device according to a third embodiment of the invention.

The rotatable mounting of the screen 12 is particularly applicable in the embodiment shown in FIG. 5.

In this third embodiment, the head-up display device 10 comprises two projectors 11, 11', respectively fixed to the two side walls 13, 14 of the cockpit.

In this embodiment, the cockpit is intended to be occupied by a single pilot P.

In this embodiment, the pilot P is placed in the center of the cockpit and the screen 12 is arranged facing the pilot along the theoretical line of sight X of the pilot, which is substantially aligned with the central longitudinal axis of the aircraft.

The implementation of two projectors 11, 11' in the head-up display device 10 thus makes it possible, in the event that one of the two projectors 11, 11' fails, to automatically use the other projector 11, 11'.

The screen 12 of the head-up display device 10 is mounted rotatably on the screen bracket 31 and can in particular occupy a first position (shown in solid lines in FIG. 5) in which the projection center of the screen 12 is located in the projection axis of a first projector 11 and a second position (shown in dotted lines in FIG. 5) in which the projection center of the screen is located in the projection axis of the second projector 11'.

In either of the first and second positions, the screen 12 forms a non-zero angle of inclination α, α' relative to the plane T perpendicular to the theoretical line of site X of the pilot P.

As mentioned above with reference to FIG. 2, the non-zero angles of inclination α, α' can be identical in a symmetrical cockpit with symmetrical positioning of the projectors 11, 11' on the two side walls 13, 14 of the cockpit.

Of course, in the event of an installation or alignment error of the projectors 11, 11', said non-zero angles of inclination α, α' can be different.

The rotation means 34 of the screen 12 are controlled by a control signal sent by a control system C.

In an embodiment, the pilot P can control the rotation of the screen 12 manually by means of an instruction sent to the control system C, in order to arrange the screen in the first or second position as defined above.

The control signal sent by the control system C can also depend on the operating status of the two projectors 11, 11'.

In this case, the control system C is directly linked to the two projectors 11, 11', making it possible to control the operation thereof and also to receive information about the status thereof, in order to detect in particular the failure of one of said projectors 11, 11'.

Thus, if a first projector 11 fails, the control system C is capable of sending an activation signal to the second projector 11' together with a control signal to the rotation means 34 of the screen 12 in order to control the rotation of the screen from the first position to the second position as defined above.

The redundancy of the two projectors 11, 11' thus makes it possible to increase the robustness of said head-up display device.

Furthermore, a computer C1, C2, incorporating in particular a microprocessor and one or more processing memories, is associated with each projector 11, 11'.

Said computers C1, C2 are connected to the other aircraft management systems and receive in particular avionics data used to generate display data to be sent to the projectors 11, 11'.

The operation of such a computer C1, C2 in a head-up display device is well known and need not be described in detail here.

Each projector 11, 11' thus receives display data originating from each computer C1, C2 by means of a main link (shown in solid lines in FIG. 5).

Said main link between each computer C1, C2 and each projector 11, 11' can be implemented using an optical fiber, for example.

Furthermore, the computers C1, C2 are capable of sending display data to the other projector 11, 11' by means of an auxiliary link (shown in dotted lines in FIG. 5). Said auxiliary link can also be implemented using an optical fiber.

Thus, the first computer C1 has a main link to the first projector 11 and an auxiliary link to the second projector 11'.

Conversely, the second computer C2 has a main link to the second projector 11' and an auxiliary link to the first projector 11.

Thus, if one of the computers C1, C2 fails, the other computer can take over and send display data to the other projector 11, 11' by means of the auxiliary link.

The redundancy of the computers C1, C2 and the projectors 11, 11' associated with the screen 12 of the head-up display device 10 thus makes it possible to provide a particularly robust, reliable system in a single cockpit.

Of course, the present invention is not limited to the embodiments described above.

In particular, the cockpit as shown in FIG. 5 could comprise only one computer used to send display data alternately to either of the projectors 11, 11' with a view to displaying it on the screen 12 of the head-up display device.

Furthermore, the control system C could be incorporated into one of the computers C1, C2.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft cockpit comprising a head-up display device comprising two projectors and at least one screen, said screen being placed facing a pilot along a theoretical line of sight of the pilot, wherein the two projectors are respectively fixed to two opposite side walls of the cockpit, wherein said side walls link a floor of the cockpit to a ceiling of the cockpit, located on the side of the pilot when said pilot is looking in the theoretical line of sight of the pilot;

wherein said screen is rotatable between a first position in which the projection center of the screen is located in the projection axis of a first of said projectors and a second position in which the projection center of the screen is located in the projection axis of the second of said projectors;

wherein in either of the first and second positions, said screen forms a non-zero angle of inclination relative to the plane perpendicular to the theoretical line of sight of the pilot, wherein the non-zero angle of inclination is between 1-degree and 20-degrees;

wherein the head-up display device comprises means of rotating the screen from and to each non-zero angle of inclination relative to the plane perpendicular to the theoretical line of sight of the pilot respectively corresponding to said first and second position, the rotation means being controlled by a control signal sent by a control system depending on the operating status of said two projectors, wherein if said first projector fails, the control system automatically rotates the screen to receive the projection from said second projector.

2. The aircraft cockpit according to claim 1, wherein said screen is rotatable on a screen bracket, wherein said screen bracket comprises an arm fixed to the ceiling of the aircraft cockpit, wherein said arm comprises rotation means at a distal end of said arm that is powered by a motor to rotate said screen.

3. The aircraft cockpit according to claim 1, wherein the head-up display device comprises two computers arranged to send display data along a main link to one of said two projectors respectively, said two computers also being arranged to send display data along an auxiliary link to the other of said two projectors respectively.

4. The aircraft cockpit according to claim 1, wherein said screen of the head-up display device is constituted by a reflective glass treated so that it reflects a light wave having a predetermined wavelength.

5. An aircraft, comprising:

a cockpit having a head-up display device comprising two projectors and at least one screen, said screen being placed facing a pilot along a theoretical line of sight of the pilot, wherein the two projectors are respectively fixed to two opposite side walls of the cockpit, wherein said side walls link a floor of the cockpit to a ceiling of the cockpit, located on the side of the pilot when said pilot is looking in the theoretical line of sight of the pilot;

wherein said screen is rotatable between a first position in which the projection center of the screen is located in the projection axis of a first of said projectors and a second position in which the projection center of the screen is located in the projection axis of the second of said projectors;

wherein in either of the first and second positions, said screen forms a non-zero angle of inclination relative to the plane perpendicular to the theoretical line of sight of the pilot, wherein the non-zero angle of inclination is between 1-degree and 20-degrees;

wherein the head-up display device comprises means of rotating the screen from and to each non-zero angle of inclination relative to the plane perpendicular to the theoretical line of sight of the pilot respectively corresponding to said first and second position, the rotation means being controlled by a control signal sent by a control system depending on the operating status of said two projectors, wherein if said first projector fails, the control system automatically rotates the screen to receive the projection from said second projector.

* * * * *